Patented Nov. 29, 1949

2,489,793

UNITED STATES PATENT OFFICE 2,489,793

LOW WATER LOSS CEMENT CONTAINING PREGELATINIZED STARCH

Norman C. Ludwig, Chicago, Ill., assignor to Universal Atlas Cement Company, a corporation of Indiana No Drawing. Application January 23, 1947, Serial No. 723,893

3 Claims. (Cl. 106—92)

This invention relates to low-water-loss cements and the slurry made therefrom. By low-water-loss cement is meant a cement which shows low loss of water from the slurry before stiffening occurs.

The invention has among its objects the provision of a cement of such character that it is effective to prevent undue loss of water from a slurry thereof such as occurs in ordinary cements, particularly when subjected to pressure in contact with porous media.

A further object of the invention is the provision of a low-water-loss cement of the above character which produces structures having high compressive strength within a reasonably short time.

The cement with which the present invention is concerned has been found most useful for sealing and solidifying underground structures, such as porous or broken formations, an operation which is necessary, for instance, in the preparation and maintenance of a deep well in the earth, such as an oil well. This operation is known as "squeeze cementing." Although the cement of the invention will be discussed primarily for such use, it is to be understood that it may be used to advantage in other applications where high fluidity of the slurry, particularly when it is subjected to elevated pressures in contact with porous structures, is desired.

It is frequently necessary in preparing an oil well for production to solidify the underground formations adjacent the well at predetermined depths to seal oil bearing formations against the entrance of water or gas. Such sealing is effected by the forcing of cement slurries down the central tubing or hollow drill rod of the well and out holes in the sides of the well casing which have been formed at the desired depth. The slurry is forced by the application of pressure into the porous formations surrounding the openings in the well casing, the formations thus being made, in effect, monolithic to form an effective barrier to encroachment of water or gas at such location. Difficulties have been experienced in the use of known cements for such squeeze cementing operation, since they lose water very rapidly when forced against a porous medium, which may have very small openings therethrough approaching capillary size, and as a result, they quickly lose fluidity. Thus, a filter cake is soon built up at the entrance of the openings of small size in the broken formation so that the formation remains porous and unsealed in numerous places. It has been recognized that it would be desirable to provide a cement for such operation which will remain fluid, despite the application of pressure, when it is forced against porous formations, in order that the smaller as well as the larger openings of the formations may be sealed. See, for example, the patent to Proctor, No. 2,233,872, dated March 4, 1941, wherein the problem is discussed.

My improved cement differs from those previously used in attempting effectively to seal such porous formations in that it has a very low water loss under pressure and that, within a reasonable time, preferably such for instance as 24 hours, it yields a structure having a high compressive strength. The cement further differs from those heretofore used by having retarded setting times which it retains in the higher temperature ranges approaching 200° F. Such effective retardation at higher temperatures is retained when there is added to the cement an agent or agents effective to retard its setting at low and high temperatures.

Briefly stated, my improvement in cement compositions consists in the addition to Portland cement or the slurry made therefrom of from 1 to 4% by weight of cement of a pregelatinized starch. This gives the slurry good water-retention properties within a temperature range of from 160 to 200° F. and also retards the setting thereof.

By "pregelatinized starch" is meant a starch which has been either partially or completely gelatinized and that partially disperses in cold water. The usual method of manufacturing such starches is to pass the raw starch paste or slurry between heated rolls to effect such gelatinization, the resulting product then being dried and pulverized to form the finished product. A certain amount of degradation of the raw stock is caused by the heat treatment and as a result a portion of the product is soluble in cold water. Typical of pregelatinized starches are the "Amijels" which are made by the Corn Products Refining Company. "Amijels" are made in different grades by varying the amount of heat treatment of the starch, such different grades being characterized by different physical and chemical properties including cold water solubility. Also included within the term "pregelatinized starch" are those which may be termed "treated pregelatinized starches." Such latter starch products are usually made by treating the raw starch with certain chemicals such as acids, alkalies and oxidizing agents before passing the paste over heated rolls. Such pretreatment produces products which are markedly more soluble in cold water than are pregelatinized starches not so pretreated. One such product is "Impermex" which is sold by Baroid Sales Division of the National Lead Company and another is "Claro," a product of the Corn Products Refining Company. The more highly soluble pregelatinized starch products have been found to be more effective retarding and water retaining agents in the practice of this invention than the less soluble pregelatinized starches.

The results of tests on specimens made from a neat cement slurry according to the invention are given in the tables below which show the water loss under pressure at different temperatures, compressive strength after 24 hours and stiffening time. The indicated water loss is so low that the slurry is able to retain its fluidity throughout an extended period even at elevated temperatures and pressures and in contact with a porous medium. Such results further show that the slurries possess a sufficiently retarded set to allow them to be pumped into place in even the deepest wells and acquire a high compressive strength after a relatively short time, such as 24 hours.

In all the following tests the cement employed was one falling within the A. S. T. M. designation C–150–44, type III, which is a high early strength Portland cement. Specifically, the cement employed was Portland high early strength and the two samples used had oxide analyses in per cent as follows:

| | Oxide analysis, per cent | | | | | | | | |
|---|---|---|---|---|---|---|---|---|---|
| | $SiO_2$ | $Al_2O_3$ | $Fe_2O_3$ | CaO | MgO | MnO | $SO_3$ | Loss on Ignition | Total |
| I | 21.2 | 5.9 | 2.5 | 64.9 | 1.1 | 0.18 | 2.3 | 1.2 | 99.28 |
| II | 20.8 | 5.9 | 2.4 | 65.4 | 0.92 | 0.13 | 2.3 | 1.4 | 99.25 |

The samples of the cements employed had specific surfaces of 2695 and 2570 cm.²/g., respectively, as measured by the Wagner turbidimeter in accordance with A. S. T. M. designation C–115–42. It is to be understood, however, that other Portland and Portland-type cements may be used, if desired.

In each of the water retention tests, the results of which are reported in ml. water loss in minutes and seconds, the test was carried out by bringing the slurry of the cement with the indicated amounts of water and pregelatinized starch to the indicated temperature, and by subjecting it to 100 lbs. per sq. in. pressure in a pressure filter of the type marketed as a Baroid Wall-Building Tester. The test method employed was similar to that specified by the American Petroleum Institute for testing drill muds. The method employed involved the use of a sheet of Whatman No. 50 filter paper at the bottom of the filter. A description of such wall-building tester and its use in testing of drill mud is found on pages 4 and 5 of the publication "Drilling Mud," May 1940, published by Bariod Sales Division, National Lead Company. To determine the water loss at elevated temperatures, the cement slurry was mixed in a metal cell placed in a heating bath, the pressure filter was preheated to the indicated temperature, the slurry was poured into the filter, and the filter and slurry were maintained at such temperature by suitable heating coils or a water jacket surrounding it. The compressive strength of each specimen reported in the tables was determined by making two-inch cubes of such slurries, allowing them to hydrate for 24 hours at the indicated temperature, and testing them to destruction on a compression testing machine. In the tests set out in the tables below all slurries except those containing "Claro" as an additive, employed the cement designated above as I. The slurries containing "Claro" were made with the cement designated II above.

Table I gives the results of tests as to water loss at different temperatures and compressive strength after 24 hours at the indicated temperature, of neat cement slurries which are typical of those used for oil well squeeze cementing. These properties for slurries containing pregelatinized starches are compared to those of a slurry containing no additive (test 1).

Table I.—Water loss and compressive strength of cements containing pregelatinized starch

| | Water, Parts per 100 Parts of Cement | Additive, Percent Weight of Cement | Water Loss at Temperatures— | | | | | | Comp. Stg. in 24 Hr. at 140° F.— p. s. i. |
|---|---|---|---|---|---|---|---|---|---|
| | | | 70°–80° F. | | | 190°–200° F. | | | |
| | | | Ml. | Min. | Sec. | Ml. | Min. | Sec. | |
| 1 | 70 | None | 184 | 2 | 10 | 153 | 0 | 52 | 2,338 |
| 2 | 70 | 2.00 Amijel No. 40 [1] | 166 | 2 | 10 | 30 | 30 | 0 | 2,650 |
| 3 | 70 | 2.00 Amijel No. 30 [2] | 160 | 2 | 12 | 14 | 30 | 0 | 2,500 |
| 4 | 70 | 3.00 Impermex [3] | 158 | 2 | 12 | 16 | 30 | 0 | 2,363 |
| 5 | 70 | 2.00 Claro [4] | 210 | 2 | 27 | 29.5 | 30 | 0 | 2,571 |
| 6 | 70 | 3.00 Claro | 208 | 2 | 45 | 14.5 | 30 | 0 | 1,709 |

[1] Solubility in cold water, 10 to 12%.
[2] Solubility in cold water, 7 to 10%.
[3] Solubility in cold water, 20 to 25%.
[4] Solubility in cold water, 70 to 85%.

It will be seen from the above table that the water loss of the slurry of test 1 was high both at room and elevated temperatures. The addition of the pregelatinized starches to such slurries, tests 2 through 6, has no appreciable effect on the water loss at 70° to 80° F., but at from 190° to 200° F. the addition of any of the types of pregelatinized starch employed decreases such water loss to a remarkable degree, so much so that any of the slurries of tests 2 through 6 can be used with success in a squeeze cementing operation at great depths where the temperature is high, since they will flow into and seal the smallest openings sought to be sealed.

The pregelatinized starch has the further function, as explained above, of acting as a very efficient set retarder at elevated temperatures, and thus a cement slurry to be used primarily at such temperatures need contain only pregelatinized starch to have both low water loss and retarded set. The effectiveness of pregelatinized starch as a set retarder at elevated temperatures is shown in the following table II, which gives the results of tests as to the stiffening times of cement slurries containing 70 parts of water by weight per 100 parts of cement. The stiffening time of the slurry was determined by use of an apparatus such as shown in Weiler Patent No. 2,122,765, dated July 5, 1938, which is known as the "Halliburton Consistometer," and is designed to test stirring or pumpability time of cement slurries at high temperatures. Such device consists essentially of a rotating cylindrical container with an internal paddle assembly fixed to a head whose movement is independent of the container. With the container filled with cement slurry, the force against the paddle due to rotation of the container and the viscosity of the slurry is transferred from the head of the apparatus to a pendulum lever arm by a suitable connection. The pendulum range is graduated from 0 to 10 divisions, representing slurry viscosities of 0 to 100 poises. A pull of 10 divisions on the pendulum is considered to represent the limit of pumpability of the slurry in an oil well. The temperature of the slurry during the test was maintained at the degree indicated by a thermostatically controlled bath surrounding the container. In the following tables, stiffening time was taken as the time from initiation of the test in the consistometer until the indicator on the pendulum indicated a slurry viscosity of 100 poises.

Table II.—Stiffening time and compressive strength of cements containing *pregelatinized starch* alone

| | Additive, Per cent Weight of Cement | Stiffening Time at 200° F. | | Comp. Stg. in 24 Hr. at 140° F.— p. s. i. |
|---|---|---|---|---|
| | | Hr. | Min. | |
| 1 | None | 0 | 37 | 2,338 |
| 2 | 2.00 Amijel No. 30 | 3 | 36 | 2,500 |
| 3 | 2.00 Amijel No. 40 | 5 | 15 | 2,650 |
| 4 | 3.00 Impermex | +8 | | 2,363 |
| 5 | 2.00 Claro | 7 | 4 | 2,571 |
| 6 | 3.00 Claro | +8 | | 1,709 |

The stiffening times of the specimens in tests 2, 3, 4, 5, and 6 in Table II are fully adequate, particularly those in tests 3, 4, 5, and 6, for the great majority of all cementing operations such as described, and thus the cement will be readily pumpable over a relatively long period and readily flowable into fine openings forming an effective barrier in a relatively short time. The addition of pregelatinized starch also appears in general to add somewhat to the compressive strength of the cement after 24 hours.

The difference in behavior between pregelatinized starch employed in the present invention and other materials such as those designated "gels," and disclosed in the above mentioned patent to Proctor, is clearly shown in the results set out in the following table.

water loss, produce cements having low compressive strengths in 24 hours, do not set, or having combinations of two or more of these defects. Thus, all of the specimens in tests 1 to 8, inclusive, have very high water losses at both room temperature and 190° to 200° F. The specimens in tests 9 and 10 had high water losses and either did not set or gave extremely low compressive strengths. Those in tests 11, 12, 14, 15 and 16 gave low water losses at room temperature, but in general, high water losses at elevated temperatures and either did not set or had low compressive strengths. The cement in test 13 did not set. The specimens in tests 17 to 20, inclusive, had high water losses at both temperatures, and, in general, did not set. It is clear, therefore, that pregelatinized starch employed in the present invention functions in a manner which is markedly different from gels heretofore suggested for the same purpose.

Whereas I have disclosed preferred compositions of the cement, cement slurries, and methods of making them, it is to be understood that the invention is capable of considerable variation as to details. I, therefore, claim as new the following.

This is a continuation-in-part of application Serial No. 655,603, filed March 19, 1946, now abandoned.

I claim:

1. A cement capable of forming a fluid slurry when mixed with water, said cement comprising a hydraulic cement mixed with from 1.0 to 4.0% pregelatinized starch by weight of the dry cement.

2. A cement capable of forming a fluid slurry when mixed with water, said cement comprising Portland cement mixed with from 1.0 to 4.0% pregelatinized starch by weight of the dry cement.

3. A hydraulic cement slurry, said slurry consisting essentially of Portland cement, water, and from 1.0 to 4.0% pregelatinized starch by weight of the dry cement.

Table III.—Water loss and compressive strength of cements containing various additives

| | Water Pts. per 100 Pts. Cement | Additive Pts. per 100 Pts. Cement | Water Loss | | | | | | Comp. Strength at 24 Hr.—2" Cubes | |
|---|---|---|---|---|---|---|---|---|---|---|
| | | | 70°–80° F. | | | 190°–200° F. | | | | |
| | | | Ml. | Min. | Sec. | Ml. | Min. | Sec. | 140° F. | 200° F. |
| 1 | 70 | None | 184 | 2 | 10 | 153 | 0 | 52 | 2,338 | 2,219 |
| 2 | 70 | 2 Raw Starch | 196 | 1 | 47 | 174 | 1 | 30 | 2,190 | 1,572 |
| 3 | 85 | 8 Raw Starch | 230 | 1 | 40 | 84 | 3 | 30 | 1,189 | 463 |
| 4 | 70 | 2 Aquagel¹ | 170 | 2 | 2 | 183 | 0 | 42 | 2,175 | 2,487 |
| 5 | 70 | 5 Aquagel | 169 | 2 | 38 | 178 | 0 | 55 | 2,083 | 2,800 |
| 6 | 70 | 10 Aquagel | 176 | 4 | 15 | 169 | 1 | 16 | 2,467 | 3,037 |
| 7 | 70 | 2 Animal Glue | 216 | 4 | 20 | 213 | 0 | 59 | 2,025 | 1,863 |
| 8 | 70 | 8 Animal Glue | 228 | 17 | 1 | 220 | 2 | 9 | 793 | 1,577 |
| 9 | 70 | 2 Agar-Agar | 160 | 2 | 48 | 148 | 1 | 27 | 274 | Not Set |
| 10 | 90 | 8 Agar-Agar | 204 | 4 | 7 | 72 | 30 | 0 | Not Set | Not Set |
| 11 | 70 | 2 Gum Arabic | 12 | 30 | 0 | 167 | 9 | 50 | Not Set | Not Set |
| 12 | 70 | 8 Gum Arabic | 3 | 30 | 0 | 39 | 30 | 0 | Not Set | Not Set |
| 13 | 70 | 2 Gum Tragacanth | 188 | 3 | 0 | 172 | 3 | 0 | Not Set | Not Set |
| 14 | 90 | 8 Gum Tragacanth | 12 | 30 | 0 | 30 | 30 | 0 | Not Set | Not Set |
| 15 | 70 | 2 Gelatine | 6.5 | 30 | 0 | 193 | 0 | 54 | 1,595 | 1,993 |
| 16 | 70 | 8 Gelatine | 2 | 30 | 0 | 238 | 2 | 48 | 1,050 | 1,283 |
| 17 | 70 | 2 Pectin | 130 | 1 | 18 | 130 | 0 | 39 | Not Set | 2,750 |
| 18 | 70 | 8 Pectin | 158 | 3 | 53 | 155 | 0 | 50 | Not Set | Not Set |
| 19 | 70 | 2 Wheat Gluten | 200 | 2 | 26 | 201 | 0 | 37 | 1,475 | 1,463 |
| 20 | 80 | 8 Wheat Gluten | 200 | 22 | 39 | 205 | 1 | 4 | Not Set | Not Set |

¹ Aquagel is classed by the producer as a mid-continent bentonitic clay.

The results in Table III show that cement slurries suitable for oil well cementing incorporating therein various gels in the suggested quantities to reduce water loss, fail to reduce the

NORMAN C. LUDWIG.

(References on following page)

REFERENCES CITED

The following references are of record in the file of this patent:

UNITED STATES PATENTS

| Number | Name | Date |
|---|---|---|
| 2,374,628 | Swayze | Apr. 24, 1945 |
| 2,384,611 | Douthett | Sept. 11, 1945 |
| 2,429,211 | Andes et al. | Oct. 21, 1947 |
| 2,430,919 | Daugelmajer | Nov. 18, 1947 |

FOREIGN PATENTS

| Number | Country | Date |
|---|---|---|
| 208,370 | Germany | Mar. 23, 1901 |

OTHER REFERENCES

Du Pont Technical Data Bulletin No. 1–1043, issued by Electro Chemicals Dept. E. I. du Pont de Nemours, Wilmington, Del.